United States Patent
Sznajder et al.

(10) Patent No.: US 8,126,897 B2
(45) Date of Patent: Feb. 28, 2012

(54) UNIFIED INVERTED INDEX FOR VIDEO PASSAGE RETRIEVAL

(75) Inventors: Benjamin Sznajder, Haifa (IL); Jonathan Mamou, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 12/481,620

(22) Filed: Jun. 10, 2009

(65) Prior Publication Data

US 2010/0318532 A1 Dec. 16, 2010

(51) Int. Cl.
*G06F 17/30* (2006.01)
(52) U.S. Cl. ............ 707/742; 707/705; 706/11; 706/14; 715/200; 725/37; 725/105; 725/135
(58) Field of Classification Search ........................ None
See application file for complete search history.

(56) References Cited

U.S. PATENT DOCUMENTS

| | | | |
|---|---|---|---|
| 5,627,936 A * | 5/1997 | Prasad et al. ................... | 386/253 |
| 7,184,786 B2 * | 2/2007 | Mumick et al. ............... | 455/466 |
| 7,257,774 B2 * | 8/2007 | Denoue et al. ................ | 715/719 |
| 7,376,645 B2 * | 5/2008 | Bernard ................................ | 1/1 |
| 7,457,825 B2 * | 11/2008 | Li et al. ................................ | 1/1 |
| 7,624,337 B2 * | 11/2009 | Sull et al. ....................... | 715/201 |
| 7,647,299 B2 * | 1/2010 | Harik ...................... | 707/999.003 |
| 2010/0066684 A1 * | 3/2010 | Shahraray et al. ............ | 345/173 |

OTHER PUBLICATIONS

Cees G.M. Snoek, "Multimedia Event-Based Video Indexing Using Time Intervals", IEEE Transactions on Multimedia, vol. 7, 2005, pp. 638-647.*
Snoek et al, "Multimodal Video Indexing: A Review of the State-of-the-art", Intelligent Sensory Information Systems, Department of Comuter Science, University of Amsterdam, Neterlands, 2003.*
Amir et al, "Mutual Relevance Feedback for Multimodal Query Formulation in Video Retrieval", ACM, 2005.*
Yacine Bellik, "Media Integration in Multimodal Interfaces", IEEE, 1997.*
Calic et al, "An Overview of Multimodal Video Representation for Semantic Analysis", University of Bristol, 2005.*
Carmichael et al, "Multimodal Indexing of Digital Audio-Visual Documents: A Case Study for Cultural Heritage Data", IEEE, 2008.*
Gunsel et al, "Video Indexing Through Integration of Syntactic and Semantic Features", IEEE, 1996.*
Hauptmann et al, "Indexing and Search of Multimodal Information", Carnegie Mellon University, 1997.*
Naphade et al, "A Probabilistic Framework for Semantic Video Indexing, Filtering, and Retrieval", IEEE, 2001.*
Radhouani et al, "Combining Textual and Visual Ontologies to Solve Medical Multimodal Queries", IEEE, 2006.*
Rajkumar et al, "Discovering Knowledge from Multi-modal Lecture Recordings", Bishop Heber College, 2008.*
Snoek et al, "A Review on Multimodal Video Indexing", University of Amsterdam, 2003.*
Kaushik Chakrabarti et al, "Ranking Objects by Exploiting Relationships: Computing Top-K over Aggregation", SIGMOD '06, 2006. http://dblab.cs.nccu.edu.tw/presentation/computing%20top-k%20over%20aggregation/Ranking%20Objects%20by%20Exploiting%20Relationships.ppt#256,1,Ranking Objects by Exploiting Relationships: Computing Top-K over Aggregation.
A. Marsden et al., "Tools for searching, annotation and analysis of speech, music, film and video—a survey", Literary & Linguistic Computing, v 22, n 4, Nov. 2007, 469-88.
C.G.M. Snoek et al., "A review on multimodal video indexing", Multimedia and Expo, 2002. ICME apos;02. Proceedings. 2002 IEEE International Conference on vol. 2, Issue , 2002 pp. 21-24 vol. 2.

* cited by examiner

*Primary Examiner* — Hung Le
(74) *Attorney, Agent, or Firm* — Daniel Kligler

(57) ABSTRACT

A method for information retrieval includes extracting from a video document visual data items and textual data items that occur in the document at respective occurrence times. Indexing records, which index both the visual and the textual data items by their respective occurrence times, are constructed and stored in a memory.

16 Claims, 2 Drawing Sheets

UNIFIED INVERTED INDEX FOR VIDEO PASSAGE RETRIEVAL

FIELD OF THE INVENTION

The present invention relates generally to data indexing and retrieval, and particularly to methods and systems for indexing and retrieval of video documents.

BACKGROUND OF THE INVENTION

Various methods and systems for indexing and retrieving video documents are known in the art. In particular, some known techniques are multimodal, i.e., index and retrieve data that is associated with different media. Multimodal techniques are described, for example, by Marsden et al., in "Tools For Searching, Annotation and Analysis of Speech, Music, Film and Video—a Survey," in Literary & Linguistic Computing, Oxford University Press, volume 22, number 4, November, 2007, pages 469-488, which is incorporated herein by reference. Multimodal indexing of video documents is addressed by Snoeck and Worring, in "A Review on Multimodal Video Indexing," Proceedings of the 2002 IEEE International Conference on Multimedia and Expo (ICME 2002), Lausanne, Switzerland, volume 2, pages 21-24, which is incorporated herein by reference.

Multimodal retrieval techniques are described, for example, by Amir et al., in "Multimodal Video Search Techniques: Late Fusion of Speech-Based Retrieval and Visual Content-Based Retrieval," Proceedings of the 2004 IEEE International Conference on Acoustics, Speech, and Signal Processing (ICASSP '04), Montreal, Canada, May, 2004, volume 3, pages 17-21, which is incorporated herein by reference. The paper describes multimodal systems for ad-hoc search, which use a late fusion of independently-developed speech-based and visual content-based retrieval systems.

Other multimodal retrieval techniques are described by Hoi and Lyu, in "A Multimodal and Multilevel Ranking Framework for Content-Based Video Retrieval," Proceedings of the 2007 IEEE International Conference on Acoustics, Speech, and Signal Processing (ICASSP '07), Honolulu, Hawaii, April, 2007, which is incorporated herein by reference. The paper describes a multimodal and multilevel ranking framework for content-based video retrieval. The framework represents video using graphs, and learns harmonic ranking functions through fusing multimodal resources over the graphs. Multimodal retrieval is also addressed in an evaluation effort entitled TRECVID, which is managed by the National Institute of Standards and Technology (NIST).

SUMMARY OF THE INVENTION

An embodiment of the present invention provides method for information retrieval, including:

extracting from a video document visual data items and textual data items that occur in the document at respective occurrence times; and constructing and storing in a memory indexing records, which index both the visual and the textual data items by their respective occurrence times.

Apparatus for information retrieval is also provided.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for multimodal indexing and retrieval of video documents. These methods and systems index data items associated with different media (e.g., image information, transcribed speech or other audio-related information, and/or textual metadata information) by their occurrence times in the documents. In some embodiments, an indexing and retrieval system extracts visual and textual data items from video documents, and produces indexing records, which index both the visual and textual data items by their occurrence times. In a particular embodiment, the indexing records are stored in a single, unified inverted index.

The system accepts multimodal queries from users, and queries the indexing records so as to retrieve video passages that match the queries. Typically, each multimodal query comprises a textual query term and a visual query term. Since both textual and visual data items are indexed by their occurrence times, the indexing scheme defined herein lends itself to efficient multimodal searching. In some embodiments, the system uses a certain temporal proximity criterion that specifies a maximum time separation between textual and visual matches. A video passage (i.e., a time interval within a document) containing textual and visual matches that meet the temporal proximity criterion is regarded as matching the multimodal query.

In some embodiments, the system scans the indexing records for textual and visual matches concurrently. In these embodiments, the system retains only video passages that meet the temporal proximity criterion. Passages that do not meet the criterion (i.e., textual matches that have no nearby visual matches, and visual matches having no nearby textual matches) are discarded. This technique is highly efficient, since irrelevant matches are discarded early in the process by considering the different modalities in parallel.

System Description

Figure 1:
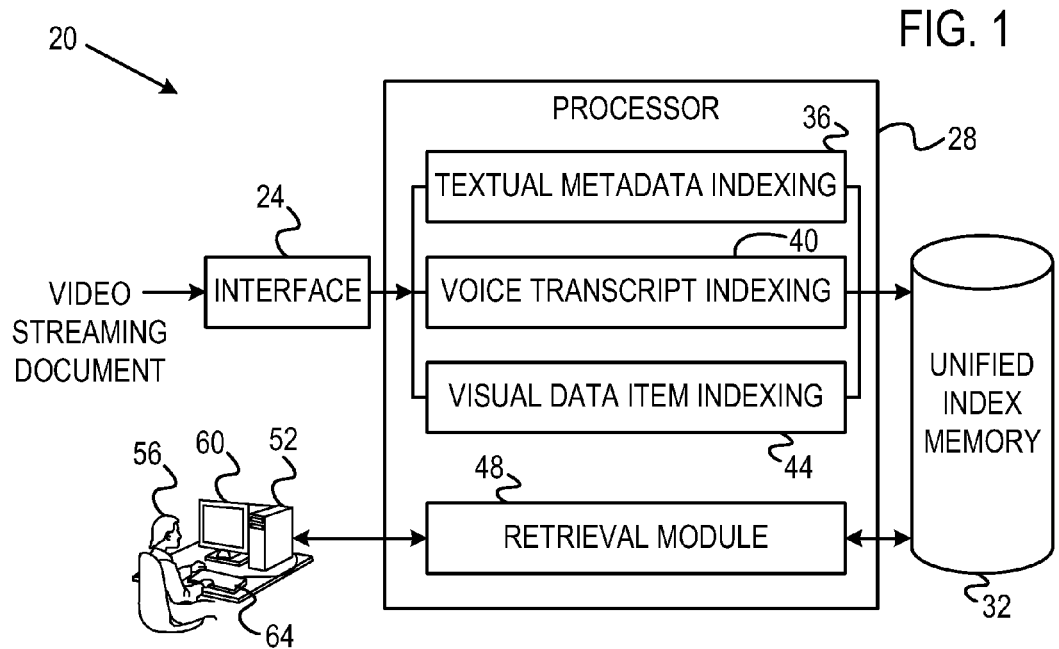
FIG. 1 is a block diagram that schematically illustrates a data indexing and retrieval system, in accordance with an embodiment of the present invention.

FIG. 1 is a block diagram that schematically illustrates a data indexing and retrieval system 20, in accordance with an embodiment of the present invention. System 20 performs indexing and retrieval functions on video documents, and enables users to retrieve data of interest from such documents. The documents that are indexed by system 20 typically comprise information associated with different media, e.g., video or image information, speech or other audio information, and/or textual information such as closed captioning or other metadata. System 20 extracts from the documents both visual and textual data items, and indexes the data items originating from the different modalities in a single, unified inverted index. Using this index, system 20 retrieves passages of interest from the documents in response to multimodal queries entered by users.

System 20 comprises an interface 24, which receives the video documents to be indexed. Interface 24 may receive the documents, for example, from a communication network (e.g., the Internet), from another computing system (e.g., a video server), from a database or from any other suitable source. The video documents are processed by a processor 28, which carries out the various indexing and retrieval functions described herein. In particular, processor 28 produces an inverted index, which indexes visual and textual data items that appear in the video documents. Processor 28 stores the inverted index in an index memory 32. Memory 32 may comprise, for example, a disk, a solid-state memory device or any other suitable type of storage device. As can be appreciated, storage of the data in memory 32 causes state transformations in the memory cells of memory 32.

In the example of FIG. 1, system 20 comprises multiple indexing modules, which extract data items of different modalities from the video documents and index them in index 32. A metadata indexing module 36 extracts textual data items from textual metadata contained in the documents. Textual metadata may comprise, for example, closed captioning that accompany the video contents, an author name, a document title, an indication of a location in which the document was produced and/or any other suitable type of metadata. In some embodiments, some or all of the extracted metadata may comprise phrases, be divided into fields and/or have a certain hierarchical structure (e.g., extensible Markup Language—XML). Module 36 may use any suitable technique for extracting the textual data items from the document metadata, and for indexing them in index 32. Techniques that use extracted closed captioning data are described, for example, in U.S. Pat. No. 5,703,655, whose disclosure is incorporated herein by reference.

A voice transcript indexing module 40 extracts and indexes textual data items from transcribed speech of the documents. Module 40 may use any suitable Speech-to-Text (STT) method for this purpose. The transcribed speech may be represented, for example, as words, parts of words or phonemes. Module 40 may use any suitable technique for extracting the textual data items from the transcribed speech, and for indexing them in index 32. Techniques of this sort are described, for example, by Mamou et al., in "Combination of Multiple Speech Transcription Methods for Vocabulary Independent Search," Proceedings of the 31$^{st}$ Annual International ACM SIGIR Conference, Singapore, Jul. 20-24, 2008, by Mamou et al., in "Vocabulary Independent Spoken Term Detection," Proceedings of the 30$^{th}$ Annual International ACM SIGIR Conference, Amsterdam, the Netherlands, Jul. 23-27, 2007, and by Mamou et al., in "Spoken Document Retrieval from Call Center Conversations," Proceedings of the 29$^{th}$ Annual International ACM SIGIR Conference, Seattle, Wash., Aug. 6-11, 2006, whose disclosures are incorporated herein by reference.

A visual data item indexing module 44 extracts visual data items from the video (visual) content of the documents, and indexes these data items in index 32. In the present context, a visual data item may comprise any suitable type of textual term (e.g., word, phrase, token or string) that describes a given image or set of images in a video document. Module 40 may produce visual data items and associate them with images, for example, by extracting text from the images using Optical Character Recognition (OCR) methods, by using semantic classifiers, by using extraction of low-level features that are represented as alphanumeric tokens, and/or using any other suitable technique. In a typical process, module 40 selects a set of representative images from a given video document, assigns textual tokens to the representative images, and indexes the textual tokens in index 32. Module 40 may use any suitable technique for producing the visual data items from the video content of the documents, and for indexing them in index 32.

Techniques of this sort are described, for example, by Sznajder et al., in "Metric Inverted—an Efficient Inverted Indexing Method for Metric Spaces," Proceedings of the 30$^{th}$ European Conference on Information Retrieval (ECIR), Glasgow, Scotland, Mar. 30-Apr. 3, 2008, by Squire et al., in "Content-Based Query of Image Databases, Inspirations from Text Retrieval: Inverted Files, Frequency-Based Weights and Relevance Feedback," Proceedings of the 10$^{th}$ Scandinavian Conference on Image Analysis (SCIA), Kangerlussuaq, Greenland, Jun. 7-11, 1999, and by Muller et al., in "Efficient Access methods for Content-Based Image Retrieval with Inverted Files," Proceedings of the Society of Photo-Optical Instrumentation Engineers (SPIE), volume 3846, pages 461-472, whose disclosures are incorporated herein by reference.

In summary, modules 36, 40 and 44 extract textual and visual data items from the video documents, and index the different types of data items in inverted index 32. Both the textual and visual data items are indexed in this single index by their occurrence time in the document, as will be described in detail below.

System 20 further comprises a retrieval module 48, which retrieves passages from video documents in response to user queries, using index 32. Module 48 interacts with a user terminal 52 operated by a user 56. The user enters multimodal queries using an input device 64, e.g., keyboard or mouse, and the results are presented to the user on an output device 60, e.g., a display.

The system configuration shown in FIG. 1 is an example configuration, which is chosen purely for the sake of conceptual clarity. In alternative embodiments, any other suitable system configuration can be used. For example, although the embodiments described herein refer to a single inverted index, the methods and systems described herein can be carried out using two or more separate indices, e.g., an index for visual data items and another index for textual data items. Nevertheless, each of these indices indexed data items by their occurrence times. As another example, the indexing and retrieval functions may be split between separate processors. In some embodiments, system 20 may interact with multiple users, e.g., over the Internet or other network, in order to provide passage retrieval services. For example, system 20 may interact with mobile communication devices operated by the users, such as cellular phones, mobile computers or Personal Digital Assistants (PDAs).

Unified Indexing of Textual and Visual Data Items

In system 20, processor 28 indexes each textual and visual data item by its occurrence time in the document. This scheme sets a common ground for indexing data items originating from different modalities (e.g., images, transcribed speech and/or metadata) and enables the processor to identify time intervals within the documents, which best match a multimodal search query.

Figure 2:
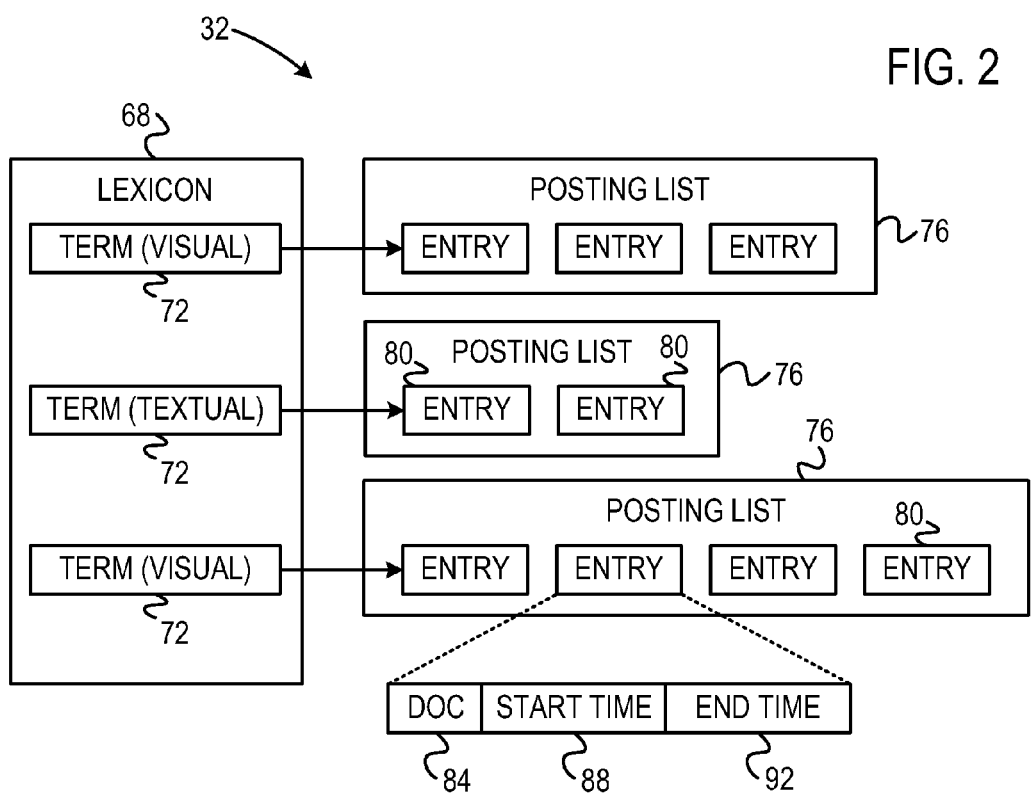
FIG. 2 is a diagram that schematically illustrates a unified inverted index, in accordance with an embodiment of the present invention.

FIG. 2 is a diagram that schematically illustrates the structure of unified inverted index 32, in accordance with an example embodiment of the present invention. Index 32 comprises a lexicon 68, which comprises a list of lexicon terms 72. Each term 72 comprises a textual or visual data item that was extracted from the video documents. Each lexicon term 72 is associated with a respective posting list 76, which comprises one or more entries 80. Each lexicon term 72 and its respective posting list is regarded as a type of indexing record, which indexes the data item in question by its occurrence times in the documents. In alternative embodiments, any other suitable type of indexing record can also be used.

In the example of FIG. 2, each entry 80 specifies an occurrence of the lexicon term in one of the video documents. Typically, each occurrence of a given lexicon term is indexed in the posting list by (1) the document in which it occurred, and (2) the start and end times of the occurrence within the document. The start and end times are usually represented as time offsets from the beginning of the document, but may alternatively be represented using any other suitable convention. Typically, each posting list entry 80 comprises a document ID field 84, a start time field 88 and an end time field 92 for holding this information.

As can be seen in the figure, terms 72 are indexed in a similar manner in index 32, regardless of whether they originate from textual metadata, from transcribed speech or from video content. For a textual data item, a posting list entry {doc, start, end} indicates that the term in question appears in document doc, starting from offset start and ending at offset end. For visual data item indexing, module 44 typically converts each shot selection into one or more textual tokens. Each token is assigned start and end times and is indexed in a separate posting list entry {doc, start, end}. Some data items (e.g., the document title or author) are not necessarily associated with any particular occurrence time within the document. Such data items are typically indexed using the start and end times of the entire document.

Consider, for example, a three-minute video document denoted doc. Assume that module 44 selects from this document ten representative images denoted $image_1 \ldots image_{10}$, each image representing an eighteen-second time interval in the document. (Generally, it is similarly possible to select images that represent intervals of different lengths.) Assume also that each representative image $image_k$ is represented by n textual tokens denoted $t_{k1}, \ldots t_{kn}$. In this example, $image_1$ is represented by n lexicon terms (the n textual tokens $t_{11}, \ldots t_{1n}$). For each of these terms, a posting list entry of the form {doc, 0, 18} is created. Similarly, $image_2$ is represented by n lexicon terms (the n textual tokens $t_{21}, \ldots t_{2n}$). For each of these terms, a posting list entry of the form {doc, 18, 36} is created. The present example refers to images, which represent equal-size time intervals and are represented by the same number of textual tokens. Alternatively, however, different representative images may represent intervals of different sizes, and may be represented by different numbers of tokens.

Figure 3:
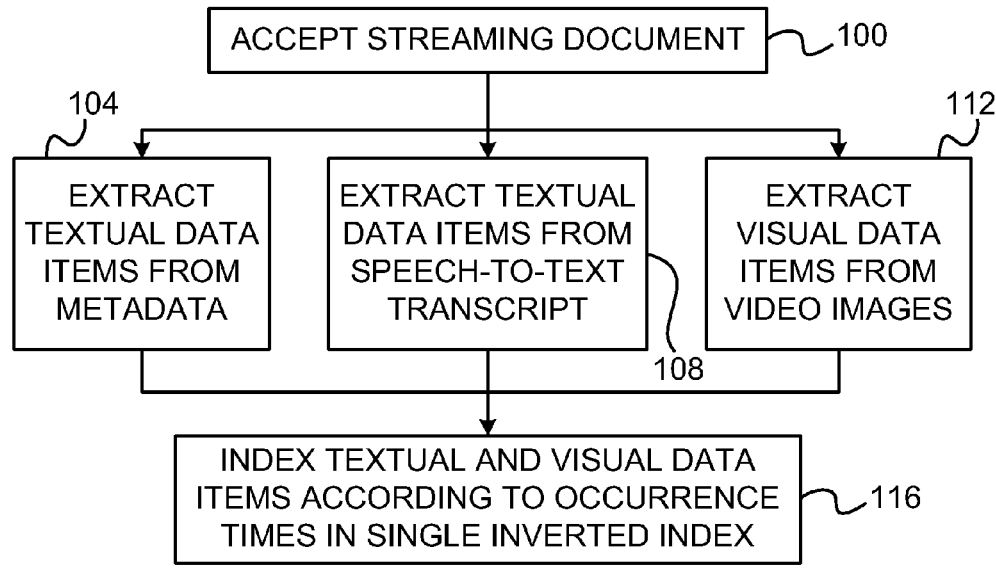
FIG. 3 is a flow chart that schematically illustrates a method for data indexing, in accordance with an embodiment of the present invention.

FIG. 3 is a flow chart that schematically illustrates a method for indexing of a video document, in accordance with an embodiment of the present invention. The method begins with processor 28 accepting via interface 24 a video document for indexing, at a document input step 100. Module 36 in processor 28 extracts textual data items from the metadata of the document, at a metadata extraction step 104. Module 40 extracts textual data items from the transcribed speech of the document, at a speech data extraction step 108. Module 44 extracts visual data items from the video content of the document, at a visual data extraction step 112. The visual data items may comprise, for example, textual tokens assigned to selected representative images.

Processor 28 indexes the various textual and visual data items in unified inverted index 32, at an indexing step 116. Processor 28 indexes the different data items based on their occurrence times in the document. The output of the method of FIG. 3 is a unified inverted index that indexes the textual and visual data items, as shown in FIG. 2 above.

Passage Retrieval Based on Temporal Proximity between Textual and Visual Data Items System 20 retrieves selected passages from the indexed video documents, in response to multimodal search queries entered by users. A typical multimodal query comprises a textual query term and a visual query term. The textual query term typically comprises a Boolean expression, which specifies textual words or phrases that are of interest. The visual query term specifies images that are of interest. The multimodal query as a whole requests system 20 to retrieve video passages (i.e., time intervals in video documents), which match a certain visual constraint (applying to the video content) and a certain textual constraint (applying to the speech and metadata).

In some embodiments, the visual query term comprises a Boolean expression specifying one or more textual tokens that define the images of interest. Alternatively, the visual query term entered by the user may comprise an image, indicating that the user is interested in images similar to this image. In these embodiments, processor 28 may transform the entered image to a set of textual tokens (e.g., semantic concepts or low-level features) before initiating the retrieval process.

In response to the multimodal query, retrieval module 48 in processor 28 retrieves video passages that match both the textual and visual query terms. Since both textual and visual data items are indexed by their occurrence times in the documents, processor 28 is able to query index 32 and find passages that match both data item types. Typically, processor 28 uses a certain temporal proximity criterion between textual matches (occurrence times that match the textual query term) and visual matches (occurrence times that match the visual query term). Using such a criterion, a time interval that begins with a matching image and ends with a matching transcribed speech item may also be considered relevant.

Consider, for example, a first passage that matches the textual query term, and a second passage that matches the visual query term. These passages are denoted {text_start, text_end} and {image_start, image_end}, respectively. An example criterion determines the distance metric dist between these two passages by:

- If (text_start≧image_start) AND (text_end≦image_end), i.e., if the first passage is contained in the second passage, then dist=0.
- If (image_start≧text_start) AND (image_end≦text_end), i.e., if the second passage is contained in the first passage, then dist=0.
- Otherwise, dist=min[|text_start_image_end|, |text_end-image_start|, |text_start-image_start|, |text_end-image_end|].

The example temporal proximity criterion defines a threshold T as the maximum time separation between a matching textual passage and a matching visual passage. The criterion regards a certain video passage as matching the multimodal query if it contains a textual match and a visual match for which dist<T. Alternatively, processor 28 may use any other suitable criterion for determining whether a certain video passage matches both the textual and visual query terms.

Figure 4:
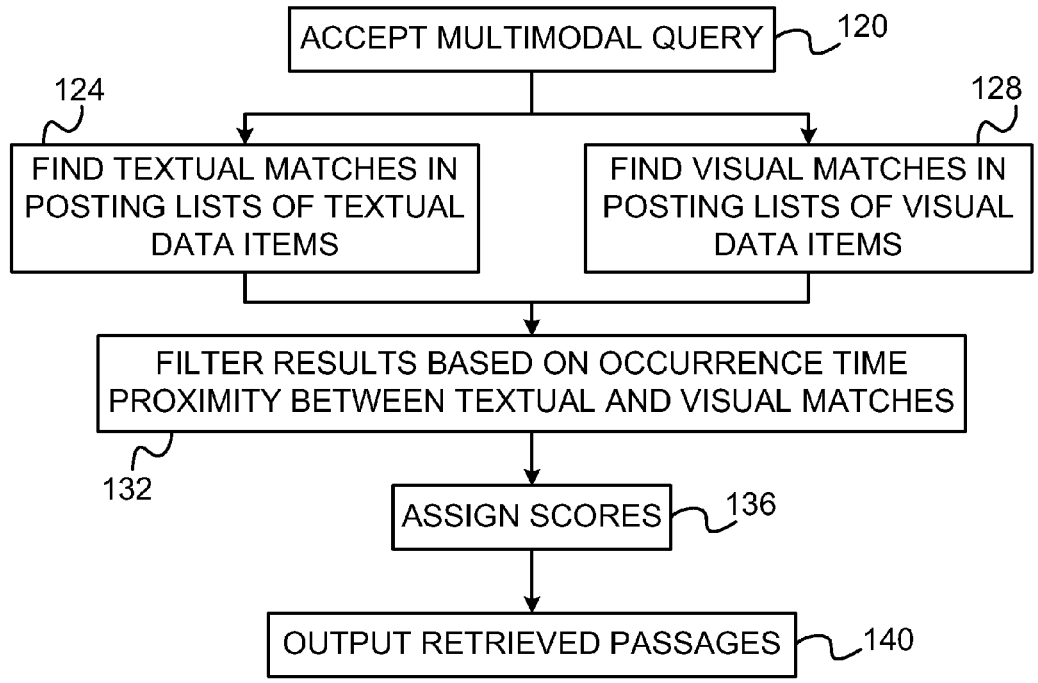
FIG. 4 is a flow chart that schematically illustrates a method for data retrieval, in accordance with an embodiment of the present invention.

FIG. 4 is a flow chart that schematically illustrates a method for data retrieval, which is carried out by module 48 in processor 28, in accordance with an embodiment of the present invention. The method begins with processor 28 accepting a multimodal query from user terminal 52, at a query input step 120. Typically, the query is entered by user 56 using input device 64. Processor 28 queries index 32 and finds video passages that match the textual query term of the multimodal query, at a textual matching step 124. Each textual match is defined by respective start and end times, which specify its occurrence time in a given document. Processor 28 queries index 32 to find video passages that match the visual query term of the multimodal query, at a visual matching step 128. Each visual match is also defined by respective start and end occurrence times.

Based on the textual and visual matches, processor 28 identifies video passages that jointly match both the textual and the visual query terms, at a multimodal matching step 132. Typically, processor 28 applies the temporal proximity criterion described above in order to identify video passages that contain both textual and visual matches.

In some embodiments, the multimodal query is divided into multiple sub-queries (e.g., visual query, transcribed speech query and metadata query), and processor 28 queries index 32 with each sub-query separately. Each sub-query returns a set of passages. Then, the processor filters the returned passages using the temporal proximity criterion. This filtering operation can be carried out, for example, using a NearQuery( ) constraint that is often supported by search engines. Modality-specific retrieval may use any suitable method. Methods for retrieval of speech information are described, for example, by Davis in "Speech-Based Methods in the Video Search Mix," and by Schneider et al., in "Towards Large Scale Vocabulary Independent Spoken Term Detection: Advances in the Fraunhofer IAIS Audiomining System," both published in Proceedings of the 31$^{st}$ Annual International ACM SIGIR Conference, Singapore, Jul. 20-24, 2008, which is incorporated herein by reference, as well as in U.S. Pat. No. 5,794,249, whose disclosure is incorporated herein by reference.

Techniques for processing visual or image queries are described, for example, in U.S. Pat. Nos. 6,021,231 and 6,442,538, whose disclosures are incorporated herein by reference, by Jing et al., in "A Unified Framework for Image Retrieval Using Keyword and Visual Features," IEEE Transactions on Image Processing, volume 14, number 7, July, 2005, pages 979-989, which is incorporated herein by reference, and by Deselaers et al., in "FIRE in ImageCLEF 2005: Combining Content-Based Image Retrieval with Textual Information Retrieval, " Working notes of the CLEF 2005 Workshop, Vienna, Austria, September, 2005, which is incorporated herein by reference. Video information retrieval is also addressed by an evaluation effort entitled VIDEOCLEF, which is managed by the Cross Language Evaluation Forum (CLEF).

In alternative embodiments, processor 28 carries out steps 124, 128 and 132 concurrently, e.g., by scanning the posting lists of index 32 in ascending order of occurrence times. During the scanning process, processor 28 retains only video passages that meet the temporal proximity criterion. Passages that do not meet the criterion (i.e., textual matches that have no nearby visual matches, and visual matches that have no nearby textual matches) are discarded. This technique enables processor 28 to discard irrelevant matches early in the process, by considering all the different modalities in parallel. Since irrelevant matches are discarded immediately, processor 28 does not need to store or rank these matches. As a result, the computational complexity of the retrieval process is improved and its memory requirements are relaxed.

The output of step 132 is a set of one or more video passages, which match the multimodal query. These passages are referred to herein as multimodal matches. In some embodiments, processor 28 assigns each multimodal match a respective score, at a score assignment step 136. For example, the processor may compute a modality-specific score to each textual match (speech match or metadata match) and visual match, and define the score of a given multimodal match as a weighted sum of the modality-specific scores. In some embodiments, the processor adjusts the score of a given multimodal match based on the distance dist between the textual and the visual matches. For example, the processor may multiply the score of a given multimodal match by $|1-dist|/T$. Alternatively, any other suitable scoring scheme can be used.

Processor 28 outputs the multimodal matches, i.e., the video passages that were found to match the query, at an output step 140. For example, the processor may present some or all multimodal matches to user 56 using output device 60. The presented matches may be ordered according to occurrence time, score or any other criterion.

In some embodiments, processor 28 may segment a given video document, and index each segment separately. This technique can be used, for example, for indexing long video documents. Any suitable segmentation method (e.g., methods based on shot detection) can be used for this purpose.

Although the embodiments described herein address specific types of data items, the methods and systems described herein can be used with any other suitable type of information that can be extracted from multimedia content and indexed, such as music, emotions, applause, topic detection and/or scene detection. The methods and systems described herein can also be used for indexing and retrieving video content that is associated with textual files, such as video footage of conference sessions and the associated presentation slides (e.g., Microsoft PowerPoint® files). Text items in a PowerPoint file can be associated with appropriate occurrence times.

In the description above, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate tangible or intangible medium, including but not limited to wireless, wire-line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described herein with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means, which implement the function/act specified in the flow chart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus provide processes for implementing the functions/acts specified in the flow chart and/or block diagram block or blocks.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for information retrieval, comprising:
extracting from a video document visual data items and textual data items that occur in the document at respective occurrence times;
constructing and storing in a memory indexing records, which index both the visual and the textual data items by their respective occurrence times;
accepting a search query comprising a visual query term and a textual query term;
based on the occurrence times stored in the indexing records, identifying in the video document at least one time interval that contains at least one visual data item matching the visual query term and at least one textual data item matching the textual query term, wherein identifying the at least one time interval comprises identifying one or more time intervals, each of which contains a respective first occurrence of the visual data item and a respective second occurrence of the textual data item and meets a predefined temporal proximity criterion between the first and second occurrences, as the at least one time interval; and
reporting the at least one identified time interval in response to the search query.

2. The method according to claim 1, wherein extracting the textual data items comprises extracting at least one of the textual data items from transcribed speech of the video document.

3. The method according to claim 1, wherein extracting the textual data items comprises extracting at least one of the textual data items from metadata of the video document.

4. The method according to claim 1, wherein extracting the visual data items comprises representing a selected image from the video document using one or more textual tokens, and defining one or more of the visual data items as the textual tokens.

5. The method according to claim 1, wherein identifying the at least one time interval comprises scanning the indexing records to identify the first and second occurrences and, during the scanning, retaining only the time intervals that meet the temporal proximity criterion and discarding the time intervals that do not meet the temporal proximity criterion.

6. The method according to claim 1, wherein identifying the at least one time interval comprises assigning respective scores to the at least one identified time interval.

7. The method according to claim 6, wherein assigning the scores comprises adjusting a score of a given time interval responsively to a distance between the respective first occurrence and the respective second occurrence contained in the given time interval.

8. A method for information retrieval, comprising:
extracting from a video document visual data items and textual data items that occur in the document at respective occurrence times;
constructing and storing in a memory indexing records, which index both the visual and the textual data items by their respective occurrence times, wherein constructing and storing the indexing records comprise indexing both the visual and the textual data items in a single inverted index;

accepting a search query comprising a visual query term and a textual query term;

based on the occurrence times stored in the indexing records, identifying in the video document at least one time interval that contains at least one visual data item matching the visual query term and at least one textual data item matching the textual query term; and reporting the at least one identified time interval in response to the search query.

9. Apparatus for information retrieval, comprising:

an interface, which is operative to accept a video document that includes visual data items and textual data items, which occur in the video document at respective occurrence times; and a processor, which is configured to extract the visual data items and the textual data items from the video document, to construct indexing records, which index both the visual and the textual data items by their respective occurrence times, to store the indexing records in a memory, to accept a search query comprising a visual query term and a textual query term, to identify in the video document, based on the occurrence times stored in the indexing records, at least one time interval, which contains at least one visual data item matching the visual query term and at least one textual data item matching the textual query term, and to report the at least one identified time interval in response to the search query, wherein the processor is configured to identify one or more time intervals, each of which contains a respective first occurrence of the visual data item and a respective second occurrence of the textual data item and meets a predefined temporal proximity criterion between the first and second occurrences, as the at least one time interval.

10. The apparatus according to claim 9, wherein the processor is configured to index both the visual and the textual data items in a single inverted index.

11. The apparatus according to claim 9, wherein the processor is configured to extract at least one of the textual data items from transcribed speech of the video document.

12. The apparatus according to claim 9, wherein the processor is configured to extract at least one of the textual data items from metadata of the video document.

13. The apparatus according to claim 9, wherein the processor is configured to represent a selected image from the video document using one or more textual tokens, and to define one or more of the visual data items as the textual tokens.

14. The apparatus according to claim 9, wherein the processor is configured to scan the indexing records to identify the first and second occurrences and, during the scanning, to retain only the time intervals that meet the temporal proximity criterion and to discard the time intervals that do not meet the temporal proximity criterion.

15. The apparatus according to claim 9, wherein the processor is configured to assign respective scores to the at least one identified time interval.

16. The apparatus according to claim 15, wherein the processor is configured to adjust a score of a given time interval responsively to a distance between the respective first occurrence and the respective second occurrence contained in the given time interval.

* * * * *